Jan. 2, 1968   R. E. LUNDBERG   3,361,912
SUN SHIELD FOR PHOTOELECTRIC CLOUD HEIGHT DETECTOR
Filed Dec. 7, 1964   2 Sheets-Sheet 2
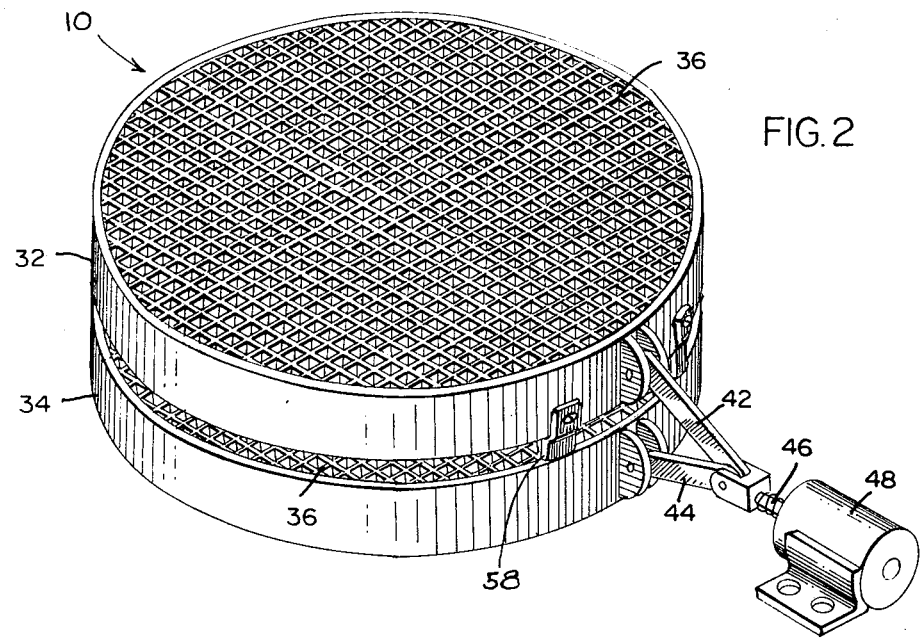
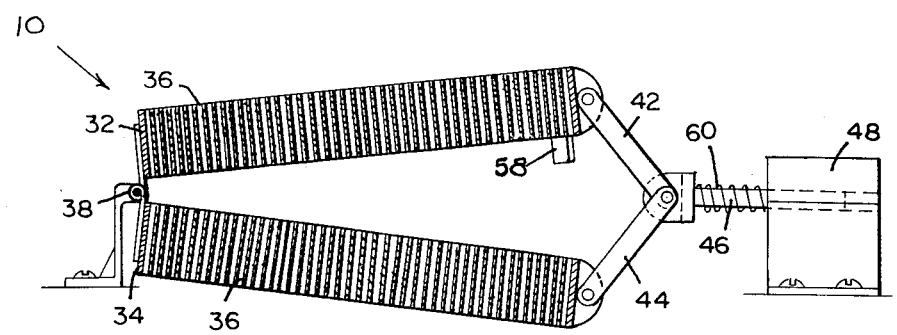
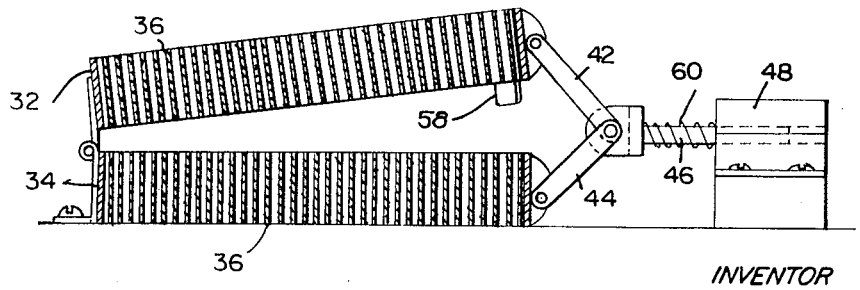
INVENTOR
RICHARD E. LUNDBERG
BY, *Robert A. Churchill*
ATTORNEY

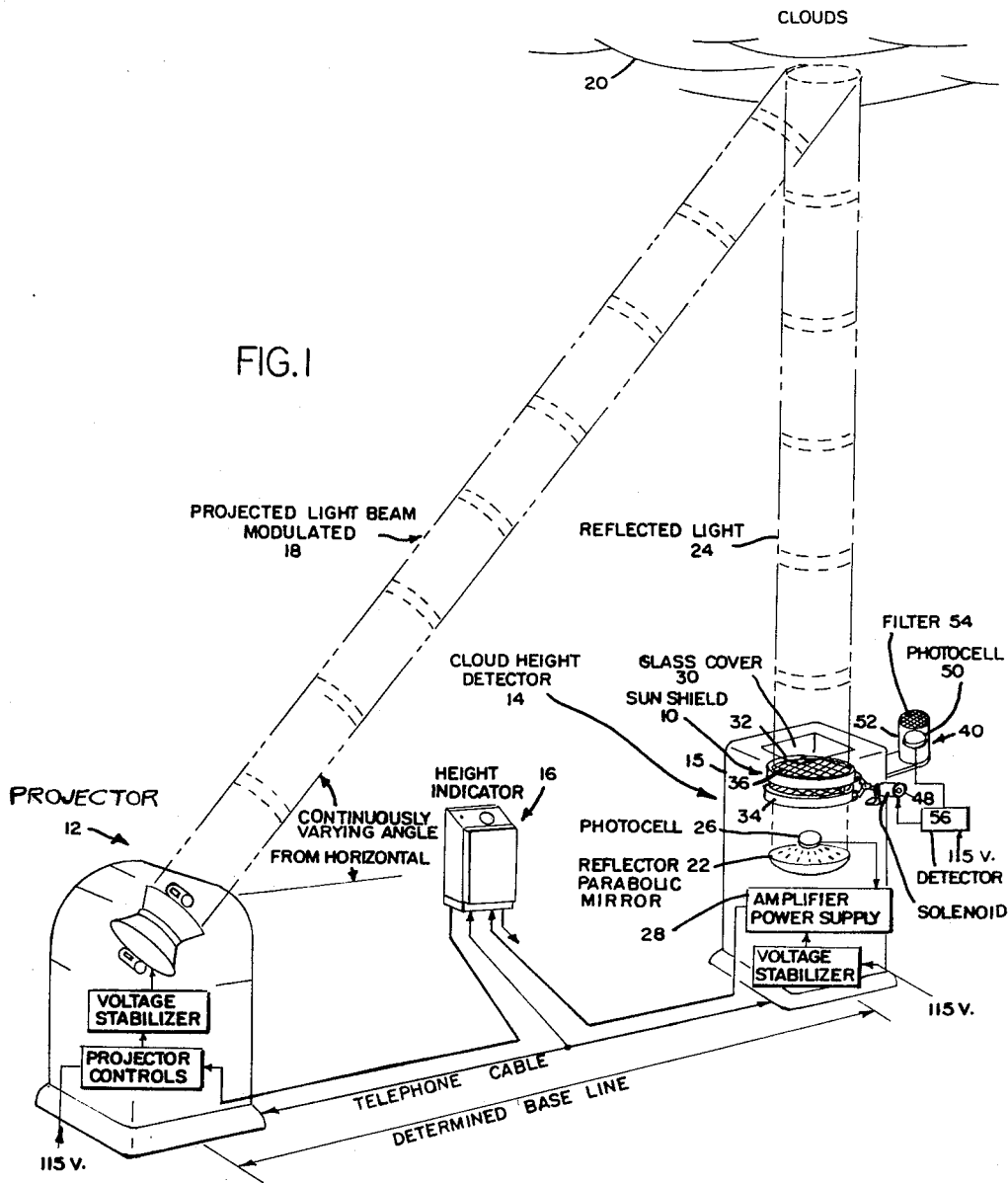

United States Patent Office 3,361,912
Patented Jan. 2, 1968

3,361,912
SUN SHIELD FOR PHOTOELECTRIC CLOUD
HEIGHT DETECTOR
Richard E. Lundberg, Ashby, Mass., assignor to Barkley
& Dexter Laboratories, Inc., Fitchburg, Mass., a corporation of Massachusetts
Filed Dec. 7, 1964, Ser. No. 416,386
10 Claims. (Cl. 250—229)

This invention relates to a light shielding device.

The invention has for an object to provide a novel and improved light shielding device and more particularly a sun shielding device particularly adapted for shielding optical and electronic equipment from the direct rays of the sun whereby to prevent burning of light-sensitive elements of the equipment.

The invention has for another object to provide a novel and improved sun shielding device of the character specified which is particularly adapted for use in cloud height measuring apparatus embodying optical and electronic equipment subject to damage by direct rays of the sun and which is characterized by means for automatically interrupting the sun's rays from a position directly overhead in a simple, efficient and rapid manner.

A further object of the invention is to provide a novel and improved light shielding device adapted for shielding optical devices and the like wherein a rapid mechanical shutter is required.

With these general objects in view and such others as may hereinafter appear, the invention consists in the sun shielding device as hereinafter described and particularly defined in the claims at the end of this specification.

In the drawings illustrating the preferred embodiment of the invention:

FIG. 1 is a perspective view of cloud height measuring apparatus showing the relationship of the major components and their connecting circuits and embodying the present invention;

FIG. 2 is a perspective detail view of the present sun shielding device shown in a position to transmit light energy therethrough;

FIG. 3 is a side elevation of the same showing the device in a position to interrupt the passage of light energy therethrough; and FIG. 4 is a similar view showing modified means for mounting the device to permit relative movement of the elements so as to interrupt the passages of light energy therethrough.

In general, the present invention relates to a light shielding device and more particularly a sun shield which comprises in effect a rapidly operating mechanical shutter of simple and efficient structure which may be used with advantage for protective shielding of optical and electronic instruments subject to damage by the direct rays of the sun. The invention is herein illustrated as embodied in an instrument for measuring the height of clouds by triangulation, such instrument being known in the art as a "cloud height set" or as a "ceilometer." The ceilometer includes a detector unit comprising a large parabolic mirror which collects light energy from a vertical path and concentrates it on a photocell.

One of the disadvantages of such prior ceilometers is that in geographical regions where the sun travels directly overhead, a cloudless day can result in severe burning of the detector unit. If such units are installed in the Tropics, specifically between the Tropic of Cancer and the Tropic of Capricorn, the sun can pass directly overhead at a particular season of the year, and the equivalent of a solar furnace action results. It is common practice to cover these units on clear days.

Trouble arises under meteorological conditions which consist of a partly cloudy day, particularly with a bright clear sun and fast moving low clouds. Prior to the present invention two general approaches have been made to counteract this problem. One solution has been to provide a motor driven horizontal window shade. Another solution has been to provide a motor driven venetian blind or slat arrangement. The principal disadvantage of such prior arrangements is that they are inherently slow moving devices such that in operation on a typical summer afternoon in southern Florida, for example, with fast moving cumulus clouds partly covering the sky, the closing operation after passage of a cloud is too slow to provide adequate protection.

In accordance with the present invention the novel sun shield is adapted to be opened or closed or, more correctly, to be positioned to admit light rays or to interrupt light rays in a few milliseconds, thereby overcoming the objections attributable to the prior protective shields. Also, the number of moving parts in the present shielding device is considerably less than the number of parts in the prior art shielding devices so that relatively long life and trouble-free operation is assured. The present sun shield also serves as a light collimator for restricting the field of view of the detector unit to the region directly overhead.

It will be understood that a ceilometer embodying the present shielding device is usually located at an airport and in most instances in a position remote from the control tower or operations personnel. Thus, although the present sun shield may be manually controlled, provision is preferably made for effecting automatic operation in response to detection of the sun in a position directly overhead.

Referring now to the drawings and particularly to FIG. 1, the present sun shield indicated generally at 10 is shown as embodied in a ceilometer which comprises in general a cloud height projector 12; a cloud height detector unit 14; and a cloud height indicator 16 arranged to automatically measure the height of clouds by triangulation. In operation, the projector 12 generates and directs a beam 18 of collimated light energy through a ninety degree sector starting from a zero point directed parallel to the ground and ending at a ninety degree position directed straight up perpendicular to the ground. This ninety degree scan sector sweeps the field of view of the detector unit 14 which is located at a fixed distance from and on a common center line with the projector 12. When cloud cover indicated at 20 is present in this scan sector, the projected light energy reflected from the cloud is seen and interpreted by the detector unit 14. As herein shown, the detector unit includes a large parabolic mirror or reflector 22 which collects light energy from a vertical path 24 directly overhead and concentrates it on a photocell 26. The interpretation of the projected light energy reflected from the cloud is a voltage output generated by the detector amplifier 28.

For a more complete understanding of the ceilometer detector in which the present sun shield is embodied, it may be here stated that to recognize the energy generated by the cloud height measuring equipment on a cloud surface, it is necessary to code this energy for ease of detection. The coding is accomplished by the following techniques:

(1) The selection of a narrow operating energy spectrum;

(2) The modulation of the energy source at a distinct frequency.

The selection of the operating spectrum is based upon the phenomenon that only a small percentage of the infrared energy generated by the sun reaches the earth. The infrared filtering effect of the water vapor and carbon dioxide in the earth's atmosphere accounts for this condition. Since nature has provided an area where the background energy level is minimized, it is advantageous to select a portion of this area as the operating spectrum for the cloud height set. The limits of the operating spectrum are from 0.8 micron to approximately 2.7 microns.

The selection of the energy modulation frequency is made to coincide with the low noise region of the lead sulfide detector. A second consideration for the modulating frequency is to find an area that is free from man-made interference that would tend to interject erroneous signals into the electronics.

From the description thus far it will be seen that the ceilometer detector unit 14 will detect light energy that is parallel with the optical axis of the parabolic mirror or reflector 22 so that when the sun is directly overhead, the detector element 26 is subject to damage from the reflected rays of the sun. As herein illustrated, the present sun shield indicated at 10 is mounted directly above and in vertical alignment with the detector elements. In practice, it is preferred to mount the sun shield within the casing 15 which houses the electronic and optical equipment, the top of the casing being provided with a cover glass 30.

Referring now to FIGS. 2 and 3, the present sun shield comprises a pair of spaced honeycomb sections 32, 34 having vertical cells 36. When the spaced honeycomb sections are disposed in horizontal parallel relation, as shown in FIG. 2, with the cells 36 in vertical alignment, the collimated light energy is permitted to enter and pass through the aligned honeycomb sections from a point directly overhead. However, when the honeycomb sections are tilted relative to each other to dispose the cells 36 of the sections out of alignment, the transmission of light energy from the vertical beam 24 is interrupted so that it cannot impinge upon the ceilometer reflector 22.

As herein illustrated, the spaced honeycomb sections may be hinged together on one side, as indicated at 38, to permit rocking movement of the sections from a horizontal parallel position to a tilted position. The amount of rocking movement need only be sufficient to interrupt the passage of light through the cells 36 of the upper and lower sections so that the amount of movement necessary will be dependent on the size of the honeycomb cells. As an example of the proportions used in one embodiment of the invention, each section 32, 34 is twenty-six inches in diameter and three and one-quarter inches high with a vertical spacing of one and one-half inches between the sections. The honeycomb material extends throughout the three and one-quarter inch height of each section and may comprise .0025" aluminum foil with a cell size of three-eights inch square. When the two sections 32, 34 are positioned coaxially above the detector elements, light can pass through the cells with a minimum of interference. In operation, in one embodiment of the invention, the two honeycomb sections are moved apart simultaneously at the unhinged end through a distance of approximately three-quarters of an inch for each section to effect rapid interruption of the passage of light through the cells. It will be understood that the above proportions may be varied to produce the desired results.

Provision is made for automatically effecting rocking of the honeycomb sections to their unaligned position in response to a signal from a sun detector indicated generally at 40 having a field of view substantially equal to or slightly greater than the field of view of the cloud height detector. As herein shown, the unhinged or movable ends of the honeycomb sections 32, 34 are connected by links 42, 44 to the plunger 46 of a solenoid 48. The sun detector 40 comprises a photocell 50 disposed in a housing 52 open at its upper end and provided with a filter 54 to protect the unit against sun damage. The sun detector may be positioned adjacent the cloud height detector and its position may be varied so that its field of view may correspond to that of the cloud height detector. The photocell 50 is connected through a relay 56 to the solenoid 48 and is arranged to normally maintain the solenoid energized to draw the plunger 46 in a direction to maintain the honeycomb sections 32, 34 in a horizontal parallel position to permit light energy to pass through the coaxially aligned cells 36. One of the sections may be provided with a stop 58, as shown, for engagement with the other section to maintain the parallel relationship of the sections during normal cloud height measuring operation.

In operation, when the photocell 50 of the sun detector 40 detects the sun's rays in the field of view of the cloud height detector 14, a signal is transmitted to deenergize the solenoid 48. This will permit the plunger 46 to move in the opposite direction and through the connected linkage will effect rocking of the hinged honeycomb sections to their non-aligned positions, as described. Conversely, upon passage of the sun beyond the field of view of the cloud height detector, a signal will be transmitted to energize the solenoid to again effect axial alignment of the honeycomb sections in cloud height detecting position. It will be apparent that absence of input power will also deenergize the solenoid to cause the honeycomb sections to be moved to their non-parallel positions to cut off the admission of light to the cloud height detector elements. As herein shown, the plunger 46 is provided with a coil spring 60 to supplement the action of the solenoid to rock the sections into non-aligned position to automatically insure rocking apart of the sections in case of power failure.

In practice, the sun detector 40 need only distinguish between the absence or the presence of the sun to provide a relatively simple and reliable unit having a substantial signal ratio. In operation, a relatively fast response is achieved on the order of about twenty milliseconds so that when the sun arrives into a position directly overhead into the field of view of the cloud height detector the sun shield is rapidly operated to provide maximum protection for the electronic and optometric elements of the cloud height detector. It will be apparent that the sun shield may also be operated in response to other signals such as by a manual switch, or may be operated automatically by thermostatic means to effect actuation of the solenoid to rock the honeycomb sections into and out of light admitting positions.

It will be observed that the honeycomb sections in their aligned position restricts the detector's field of view to only the light energy in the region directly overhead which is parallel with the optical optical axis of the reflector or parabolic mirror 22. The presence of the honeycomb material also serves to shield and protect the photocell from visible background light. This effect helps to maintain a higher photodetector impedance which increases the sensitivity of the system. In addition, the heat rise in the cloud height detector is reduced which aids in maintaining good sensitivity.

In a modified form of the present invention, as illustrated in FIG. 4, the sun shield may comprise all of the same elements as above described except that the lower honeycomb section 34 is mounted in a stationary position, as shown, and the upper section 32 only is movable. The upper section 32 is normally maintained in parallel and coaxial alignment with the lower section for cloud height measuring operation, and the solenoid 48 is normally energized to maintain this condition. In operation, when the photocell 50 detects the rays of the sun in the field of view of the cloud height detector the solenoid 48 is deenergized to cause the upper section 32 to rock upwardly relative to the stationary lower section 34 whereby to rapidly interrupt the transmission of light energy through the sections.

It will be understood that where the term "sun shield" occurs in the specification and claims it is intended that this term will include a light admitting and interrupting device providing, in effect, a shutter.

While the preferred embodiment of the invention has been herein illustrated and described, it will be understood that the invention may be embodied in other forms within the scope of the following claims.

Having thus described the invention, what is claimed is:

1. A sun shield of the character described comprising a pair of honeycomb sections, each adapted to permit transmission of light along an optical axis, said sections normally being arranged coaxially to permit transmission of light therethrough, and means for rotating at least one of said sections about an axis perpendicular to its optical axis so that the pair of sections will be out of coaxial relation so as to interrupt the passage of light therethrough.

2. A sun shield of the character described comprising a pair of spaced honeycomb sections, each adapted to permit transmission of light along an optical axis, said sections normally being arranged coaxially with the cells of one section aligned with the cells of the second section to permit transmission of light therethrough, and means for rotating at least one of said sections about an axis perpendicular to its optical axis so that the pair of sections will be out of coaxial alignment with the other section so as to interrupt the passage of light therethrough.

3. A sun shield of the character described comprising a pair of spaced honeycomb sections, each adapted to permit transmission of light along an optical axis, said sections being hingedly connected together and normally arranged coaxially with the cells of one section aligned with the cells of the second section to permit the transmission of light therethrough, and means for rocking about an axis perpendicular to its optical axis at least one of said sections out of axial alignment with the other section to interrupt the passage of light therethrough.

4. A sun shield of the character described comprising a pair of honeycomb sections, each adapted to permit transmission of light along an optical axis, said sections being normally arranged coaxially to permit the transmission of light therethrough, means for detecting the rays of the sun within the field of view of said sections, and means responsive thereto for rotating said sections about an axis perpendicular to its optical axis, so as to be out of coaxial relation so as to interrupt the passage of the sun rays therethrough.

5. A sun shield of the character described comprising a pair of spaced cellular elements adapted to permit transmission of light along an optical axis, said elements being normally arranged coaxially with the cells of one element aligned with the cells of the second element to permit transmission of light energy therethrough, and means for automatically rotating said cellular elements out of coaxial alignment with each other when the sun arrives in alignment with the cells whereby the passage of the sun rays therethrough is interrupted.

6. In a ceilometer of the character described provided with electronic and optometric cloud height detecting elements subject to damage by direct sunlight, a sun shield arranged coaxially with said cloud height detecting elements comprising a pair of spaced cellular elements adapted to permit transmission of light along an optical axis, said cellular elements being normally arranged with their optical axes in alignment to permit the transmission of light energy therethrough, means for detecting the rays of the sun within the field of view of said cloud height detecting elements, and means responsive thereto for rapidly rotating at least one of said cellular elements about an axis perpendicular to its optical axis so as to interrupt the passage of the sun rays therethrough.

7. In a ceilometer having electronic and optometric cloud height detecting elements subject to damage by direct sunlight, a sun shield arranged coaxially with said cloud height detecting elements comprising a pair of spaced honeycomb sections adapted to pass light along an optical axis, said sections being hingedly connected together and normally arranged in parallel relation with the cells of one section aligned vertically with the cells of the second section to permit the transmission of light energy therethrough, means including a solenoid mechanically connected to said sections for rocking the same about an axis perpendicular to their optical axis so that they are out of coaxial alignment whereby the passage of the sun rays therethrough is interrupted, and control means for actuating said solenoid.

8. A sun shield as defined in claim 7 wherein the control means includes a sun detector positioned in the field of view of said cloud height detecting elements and operatively connected in circuit with said solenoid whereby to automatically effect rocking of the honeycomb sections into coaxial alignment by the absence of the sun and out of coaxial alignment by the presence of the sun in the field of view of said cloud height detecting elements.

9. A sun shield as defined in claim 7 wherein the honeycomb sections are both rocked simultaneously into and out of parallel and coaxial alignment.

10. A sun shield as defined in claim 7 wherein one of said honeycomb sections is fixed and the second section only is movable to be rocked into and out of parallel and coaxial alignment.

References Cited

UNITED STATES PATENTS

| | | | |
|---|---|---|---|
| 2,186,203 | 1/1940 | Centeno | 350—272 |
| 2,398,799 | 4/1946 | Miller | 350—319 |
| 2,604,601 | 7/1952 | Menzel | 250—203 |
| 3,031,351 | 4/1962 | McIlvaine | 250—237 |

ARCHIE R. BORCHELT, *Primary Examiner.*

RALPH G. NILSON, *Examiner.*

J. D. WALL, *Assistant Examiner.*